United States Patent
Glass et al.

[11] Patent Number: 6,041,200
[45] Date of Patent: Mar. 21, 2000

[54] METHOD AND APPARATUS FOR SPLIT PRINTING OF COLOR AND MONOCHROME DOCUMENTS

[75] Inventors: William H. Glass, Edina; Mark Lokhorst, Eden Prairie; Philip A. Lodwick, Richfield; Loren Schoenzeit, Orono, all of Minn.

[73] Assignee: Electronics for Imaging, Inc., Foster City, Calif.

[21] Appl. No.: 09/264,287

[22] Filed: Mar. 8, 1999

[51] Int. Cl.[7] ........................... G03G 15/00; G03G 21/00
[52] U.S. Cl. .................................. 399/82; 399/84
[58] Field of Search ................................ 399/82, 84, 407

[56] References Cited

U.S. PATENT DOCUMENTS

| | | | |
|---|---|---|---|
| 4,469,323 | 9/1984 | Miyashita et al. | 271/288 |
| 5,296,907 | 3/1994 | Kawabuchi et al. | 399/82 X |
| 5,640,647 | 6/1997 | Hube | 399/84 |
| 5,655,759 | 8/1997 | Perkins et al. | 399/84 X |
| 5,815,643 | 9/1998 | Van Deurzen et al. | 399/82 X |

*Primary Examiner*—Fred L Braun
*Attorney, Agent, or Firm*—Barry R. Lipsitz; Ralph F. Hoppin

[57] ABSTRACT

A system for printing and copying color and black-and-white documents avoids the need for manual collating. The system provides N sets of documents using a printer and a copier, where each set of documents includes a first type of sheets (such as black-and-white sheets), and a second type of sheets (such as color sheets) provided in a particular sequence in relation to the first type of sheets. A first complete document set is printed, including the first and second types of sheets, along with N−1 insert sets of the second type of sheets, and an instruction sheet indicating the particular sequence. The first complete document set is positioned in a document feeder of the copier, and the N−1 insert sets are positioned in a post-process insertion tray of the copier. The copier is programmed using the instruction sheet to identify the particular sequence, and to output copies of the sheets of the first type from the first complete document set, and to output the sheets of the second type from the N−1 insert sets to replace the sheets of the second type in the first complete document set, thereby forming N complete document sets, in which the sheets of the second type are provided in the particular sequence.

15 Claims, 2 Drawing Sheets

METHOD AND APPARATUS FOR SPLIT PRINTING OF COLOR AND MONOCHROME DOCUMENTS

BACKGROUND OF THE INVENTION

The present invention relates to a system for printing and copying color and monochrome (e.g., black-and-white) documents. In particular, the invention provides pre-collated color sheets and an instruction sheet that allow a user to easily program a monochrome photocopier to insert the color sheets into their proper position in a final mixed document that includes the color sheets and copies of the monochrome sheets.

Photocopiers and color printers have become an indispensable part of most offices, and are becoming increasingly popular for personal use as well. Color printers, including laser printers, can provide high quality text and graphic images on various document substrates, including paper and transparencies. Moreover, recently digital document processing systems, which employ both printing and photocopying capabilities, have become popular.

However, such systems have a relatively high per-page operating cost. In practice, a user may wish to print and photocopy a document that has mostly black-and-white pages, and only a few color pages. For example, in a document such as a report or business plan, color pages may be used for the cover page, the first page of the different sections in the report, and for various graphs which are interspersed among a large number of black-and-white text pages. Accordingly, it is inefficient to photocopy such a document on a color photocopier when most of the pages in the document are black-and-white. It is also inefficient to print one or more copies of such a document on a printer with color and monochrome printing capabilities.

In particular, depending on the arrangement made by the user, a document processing system may have a counter that maintains a count of the total number of color and black-and-white copied pages and the user is billed according to this count.

In contrast, conventional black-and-white photocopiers can produce a large number of photocopies very economically. However, of course, such photocopiers cannot provide color documents.

If a user desires to print several sets of a document, where the document includes both black-and-white and color pages, the user may print out one complete document, remove the black-and-white pages, and photocopy these pages to provide the necessary number of sets of black-and-white pages. Additionally, the user can print out a corresponding number of sets of the color pages, and manually collate the color pages with the black-and-white pages to form the final sets of documents. However, this procedure is time consuming, tedious and error-prone.

Accordingly, it would be desirable to provide a system for easily and economically forming several sets of documents where each document includes both black-and-white and color pages. The system should be compatible with existing color printers and black-and-white photocopiers.

The present invention provides a system having the above and other advantages.

SUMMARY OF THE INVENTION

The present invention relates to a system for printing and copying color and black-and-white documents. Note that the "printer" may itself be a copier coupled to receive print instructions from a computer. Alternatively, the printer and copier could be the same or different multifunction machines which provide both printing and copying functions. Of course, the printer may also be a stand alone computer printer.

A method provides one or more (e.g., N) sets of documents using a printer and a copier, and each set of documents includes a first type of sheets, and a second type of sheets provided in a particular sequence in relation to the first type of sheets. The method includes the steps of printing a first complete document set, including the first and second types of sheets. N−1 insert sets of the second type of sheets are also printed, along with an instruction sheet indicating the particular sequence. Preferably, each item is printed on the same printer although this is not required.

The first complete document set is positioned in a document feeder of the copier, and the N−1 insert sets are positioned in a post-process insertion tray of the copier. Additionally, the copier is programmed by a user according to the instruction sheet to identify the particular sequence.

The copier is programmed to output copies of the sheets of the first type in the first complete document set, and to output the sheets of the second type from the N−1 insert sets to replace the sheets of the second type in the first complete document set in the document feeder.

The copier can therefore provide the N sets of documents in which the sheets of the second type are provided in the particular sequence.

In a particular embodiment, the sheets of the first type are black-and-white, and the sheets of the second type are color. Thus, the N sets of documents will automatically include the black-and-white and color pages arranged in the appropriate sequence within each document.

The instruction sheet may have a graphical display (i.e., picture) of the particular sequence to aid in communicating to the user. The copier may have a control panel or the like with a corresponding display to simplify the programming step.

A corresponding apparatus and instruction sheet are also presented.

DETAILED DESCRIPTION OF THE INVENTION

The present invention relates to a system for printing and copying color and black-and-white documents.

Figure 1:
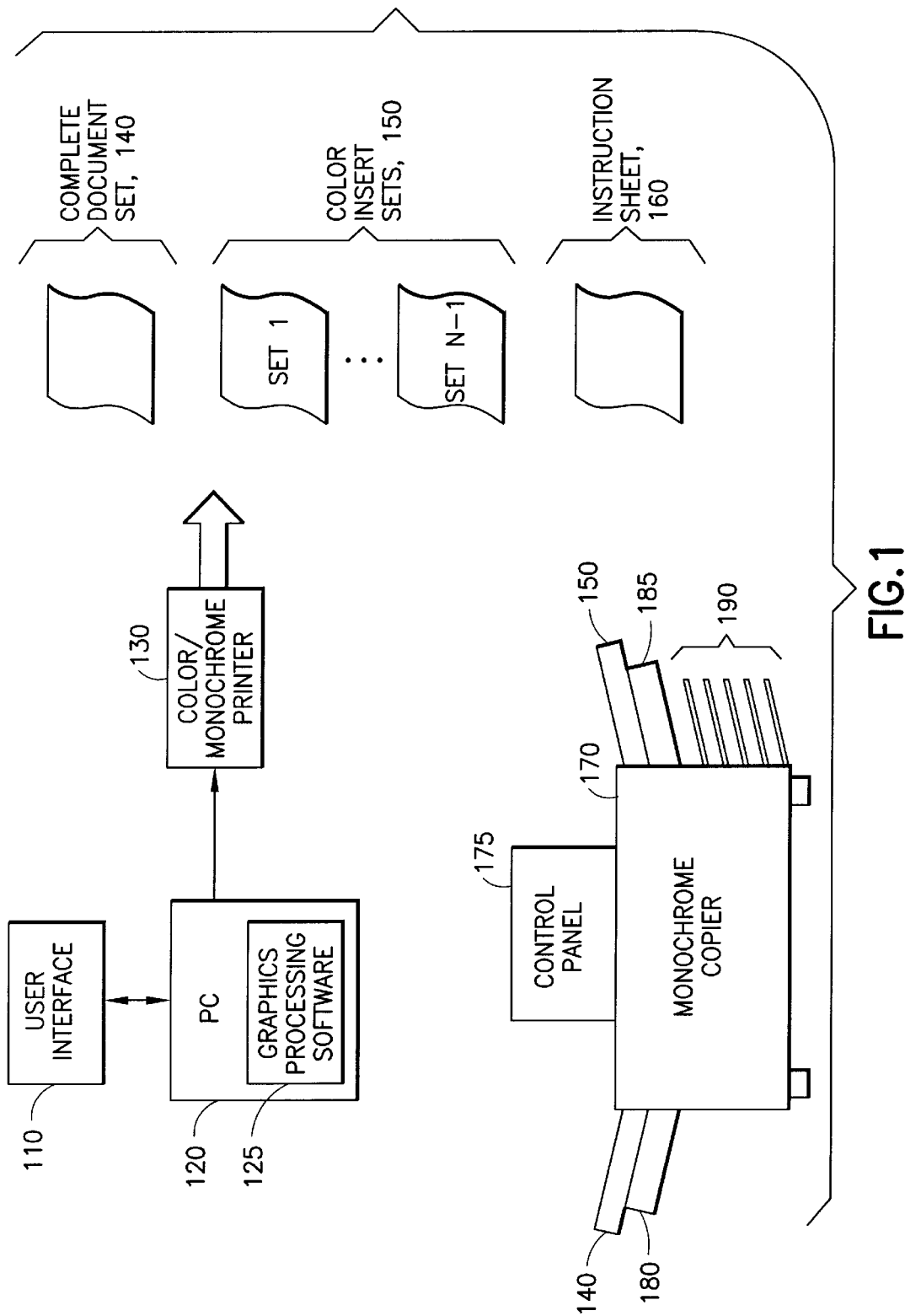
FIG. 1 illustrates a system for split mode printing of color and monochrome documents in accordance with the present invention.

FIG. 1 illustrates a system for split mode printing of color and monochrome documents in accordance with the present invention. A user interface 110 allows a user to enter commands to a personal computer (PC) 120, workstation or the like, to print out a document on a color/monochrome printer 130. The printer 130 may be a digital color printer that can print and/or copy both color and black-and-white pages. For example, a Canon CLC 2400/1000-S or CLC 1000 may be used. Generally, the images are printed on paper, although other substrates such as transparencies may be used. The PC 120 includes graphics processing software 125, such as the EDOX system, available from Management Graphics, Inc., Minneapolis, Minn., U.S.A.

Figure 2:
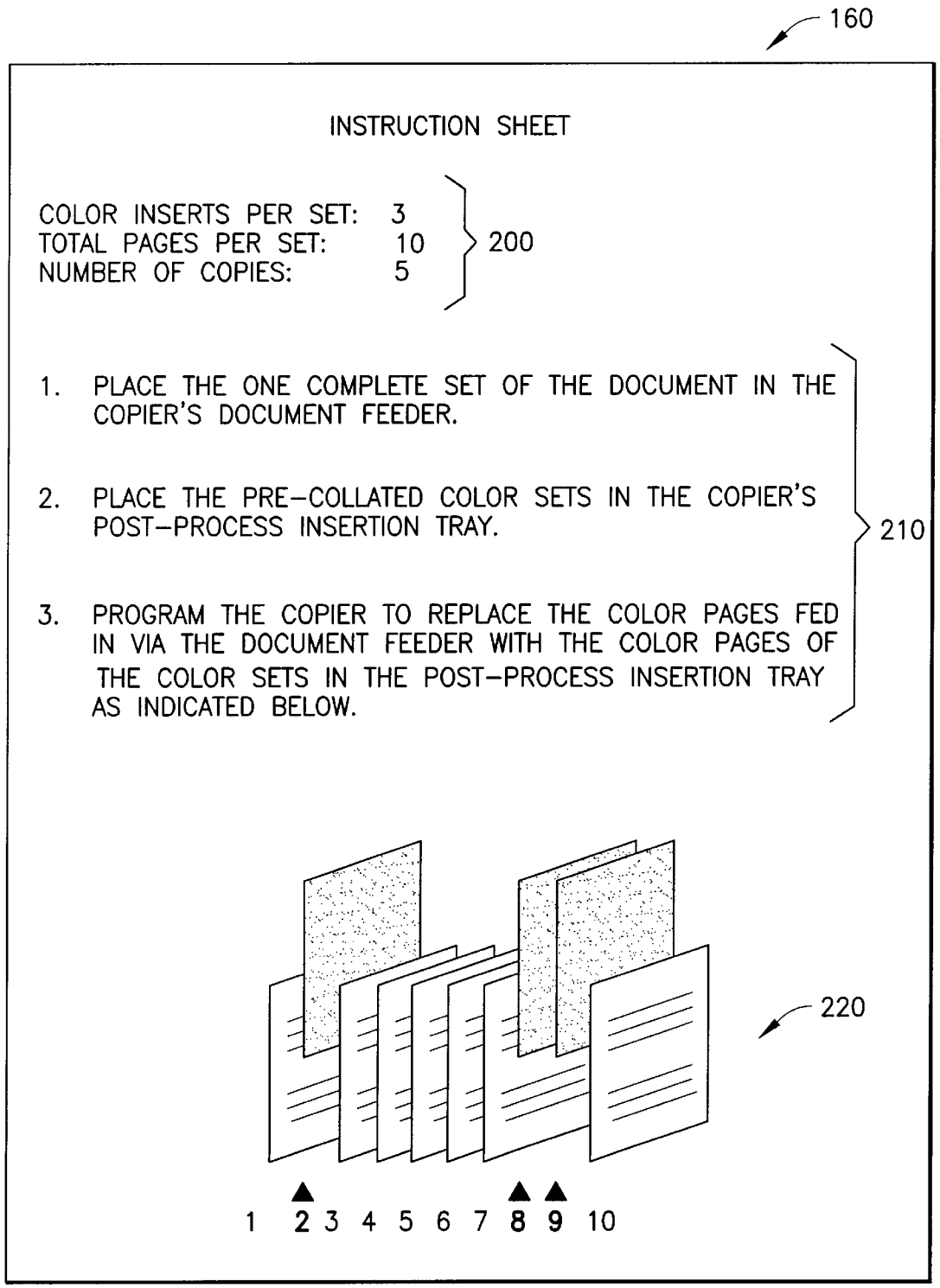
FIG. 2 illustrates a split mode instruction sheet in accordance with the present invention.

The graphics processing software 125 enables the printer 130 to print one complete document set 140, N−1 color insert sets 150 and an instruction sheet 160. The complete document set 140 includes a number of pages including both color and black-and-white pages. For example, the complete document set 140 might include ten pages total, with seven black-and-white pages and three color pages, e.g., as shown in FIG. 2.

For example, the black-and-white pages may have positions 1, 3–7 and 10 in each document, while the color pages have positions 2, 8 and 9 in each document. The color insert sets 150 include N−1 sets of the color pages only. For example, each set 1, . . . , set N−1, may include the color sheets in positions 2, 8 and 9. For instance, assuming N=5, this means it is desired to produce N−1=4 copies of the original complete document set 140.

Furthermore, in accordance with the present invention, the graphics processing software 125 commands the printer 130 to print an instruction sheet 160 that gives the user specific instructions for assembling the N=5 documents using a monochrome (e.g., black-and-white) photocopier 170. An example instruction sheet 160 is shown in FIG. 2.

FIG. 1 also shows a conventional monochrome copier 170, with a control panel 175 which allows the user to enter specific commands to the copier. The copier 170 may be, for example, the high volume Océ 3100 analog black-and-white copier. The copier 170 includes an automatic feeder 180, a post-process insertion tray 185, and one or more output trays 190.

As is known to those skilled in the art, the feeder 180 feeds in sheets, one at a time, to a platen of the copier, e.g. using a belt mechanism, wherein the sheets are imaged onto blank sheets which are subsequently output from the copier. The sheets in the post-process insertion tray 185 are fed into, passed through, and output from the copier, without being printed or otherwise modified by the copier.

In accordance with the present invention, the user enters commands to the copier 170 via the control panel 175 to inform the copier of the desired location of the colored pages within each document. Additionally, the complete document 140, (e.g., ten pages) is placed in the automatic feeder 180, and the N−1 color insert sets 150 are placed in the post-process insertion tray 185.

The user then instructs the copier 170 to produce, e.g., N=5 sets of documents. The copier 170 feeds in the color and black-and-white pages of the complete document set 140 one page at a time. Depending on the capabilities of the copier 170 and the collating mode selected, the complete document set 140 may be fed in to the copier only once to produce the N output documents, or may be fed in once for each output document. The copier 170 may have a number of conventional output trays 190.

In accordance with the present invention, each black-and-white page of a complete document set 140 that is fed into the copier 170 is photocopied where a corresponding photocopy is provided to the output trays 190. Additionally, when a color page of the complete document set 140 is fed into the copier 170, the page is not photocopied. Instead, a corresponding page from the color insert sets 150 is fed in to the copier via the post-process insertion tray 185 and output to one of the output trays 190. Thus, each color page in the complete document set 140 is replaced by a corresponding page of the color insert sets 150. In this manner, the resulting documents provided to the output tray 190 include both black-and-white and color pages. Additionally, the color pages are inserted in the appropriate sequence within each document. Therefore, there is no need for the user to manually collate the color and black-and-white pages to form the final documents.

FIG. 2 illustrates a split mode instruction sheet in accordance with the present invention. The instruction sheet 160 is formed according to the graphics processing software 125 of the PC 120 in FIG. 1. Using software techniques which should be apparent to those skilled in the art, the instruction sheet 160 provides textual and graphical instructions to the user for use in controlling the copier 170. The instruction sheet 160 may include a summary region 200 which informs the user of information such as the number of color insert pages per document set, the total number of pages per document set, and the total number of document copies which the user desires.

Furthermore, a textual region 210 includes instructions for operating the copier 170. A first step is to place the one complete document set 140 in the document feeder 180. A second step is to place the pre-collated insert sets 150 into the post-process insertion tray. A third step is to program the copier via the control panel 175 to replace the particular pages of the color set as indicated in a graphical display 220. The graphical display 220 clearly conveys to the user the location of the color sheets relative to the black-and-white sheets. For example, the color pages may be the second, eighth and ninth pages within each ten page document. The color sheets may appear colored in the display 220.

Preferably, the instruction sheet 160 is customized for ease of use with the control panel 175 of the copier 170. For example, the control panel 175 may have a key pad that allows a user to enter numbers corresponding to the positions of the color pages (e.g., 2, 8 and 9). The graphical display 220 can be laid out to correspond to the control panel 175 of the particular monochrome copier being used to allow the user to easily confirm that the correct positions for the color pages have been entered. Moreover, the graphical display 220 may have a similar size to the display provided on the control panel 175 so that the display 220 can be held up to the control panel 175 to provide a quick visual confirmation.

The control panel 175 may allow the user to enter commands via alternative means, for example, such as voice commands, direct commands from the software 125, or scanning of the instruction sheet 160 by a scanning function associated with the copier 170. The scanning may include scanning and conversion of text and/or graphics, such as bar codes, on the sheet 160.

Accordingly, it can be seen that the present invention provides a system for combining the power of a digital color printer with the economy of a high speed, black-and-white photocopier to produce final documents having both color and black-and-white pages. Appropriate graphics processing software is provided on a PC, work station or the like to command a printer to print a complete document set, including both black-and-white and color pages, N−1 color insert sets, and an instruction sheet to guide the user in programming a conventional black-and-white copier with an automatic feeder and a post-process insertion tray. Advantageously, the system enables the production of economical documents, and frees the user from the task of manual collation.

Although the invention has been described in connection with various specific embodiments, those skilled in the art will appreciate that numerous adaptations and modifications may be made thereto without departing from the spirit and scope of the invention as set forth in the claims.

For example, while the invention was discussed in terms of producing a final document with color and black-and-white pages, the invention is suitable for use in producing any document where pages of a first type must be inserted in a particular order between pages of a second type. For example, it may be desired to insert a different stock of paper, photographs or transparencies, between pages of standard paper provided by a copier.

Moreover, the complete document set, color insert sets, and instruction sheet need not be printed on the same printer.

Additionally, the color insert sets may be printed prior to when they are needed, e.g., to allow a user to make an additional number of sets of the mixed document at a later time.

What is claimed is:

1. A method for providing N sets of documents using a printer and a copier, where N≧1, and each set of documents includes a first type of sheets, and a second type of sheets provided in a particular sequence in relation to the first type of sheets, comprising the steps of:

printing a first complete document set, including the first and second types of sheets;

printing N−1 insert sets of the second type of sheets;

printing an instruction sheet indicating the particular sequence;

positioning the first complete document set in a document feeder of the copier;

positioning the N−1 insert sets in a post-process insertion tray of the copier; and programming the copier according to the instruction sheet to identify the particular sequence.

2. The method of claim 1, wherein:

in said programming step, the copier is programmed to output copies of the sheets of the first type in the first complete document set, and to output the sheets of the second type from the N−1 insert sets to replace the sheets of the second type in the first complete document set.

3. The method of claim 1, wherein:

the copier provides the N sets of documents in which the sheets of the second type are provided in the particular sequence.

4. The method of claim 1, wherein:

the sheets of the first type are black-and-white; and the sheets of the second type are color.

5. The method of claim 1, wherein:

the instruction sheet comprises a graphical display of the particular sequence.

6. The copier of claim 5, wherein:

the copier comprises a display for use in said programming step corresponding to said graphical display.

7. An apparatus for providing N sets of documents, where N≧1, and each set of documents includes a first type of sheets, and a second type of sheets provided in a particular sequence in relation to the first type of sheets, comprising:

printing means for printing a first complete document set, including the first and second types of sheets, N−1 insert sets of the second type of sheets, and an instruction sheet indicating the particular sequence; and a copier having a document feeder upon which the first complete document set is adapted to be positioned, a post-process insertion tray upon which the N−1 insert sets are adapted to be positioned, and control means adapted to be programmed according to the instruction sheet to identify the particular sequence.

8. The apparatus of claim 7, wherein:

the copier is adapted to be programmed to output copies of the sheets of the first type in the first complete document set, and to output the sheets of the second type from the N−1 insert sets to replace the sheets of the second type in the first complete document set.

9. The apparatus of claim 7, wherein:

the copier is adapted to provide the N sets of documents in which the sheets of the second type are provided in the particular sequence.

10. The apparatus of claim 7, wherein:

the sheets of the first type are black-and-white; and the sheets of the second type are color.

11. The apparatus of claim 7, wherein:

the instruction sheet comprises a graphical display of the particular sequence.

12. The copier of claim 11, wherein:

the control means comprises a display for use in programming corresponding to the graphical display.

13. An instruction sheet for use in programming a copier to output N sets of documents, where N≧1, each set of documents including a first type of sheets, and a second type of sheets are provided in a particular sequence in relation to the first type of sheets, comprising:

instructions for informing a user to program control means of the copier to inform the copier of the particular sequence;

instructions for informing the user to place a first complete document set comprising the first type of sheets and the second type of sheets arranged in the particular sequence with respect thereto in a document feeder of the copier; and instructions for informing the user to place N−1 insert sets comprising the second type of sheets in a post-process insertion tray of the copier;

wherein said copier is adapted to output the N sets of documents by outputting copies of the first type of sheets from the first complete document set, and by replacing the sheets of the second type from the first complete document set with sheets of the second type from the N−1 insert sets according to the particular sequence.

14. The instruction sheet of claim 13, wherein said indicating means comprises a graphical display of the particular sequence.

15. The instruction sheet of claim 14, wherein:

the control means comprises a display for use in programming corresponding to the graphical display.

* * * * *

UNITED STATES PATENT AND TRADEMARK OFFICE
CERTIFICATE OF CORRECTION

PATENT NO. : 6,041,200　　　　　　　　　　　　　　　　　　　Page 1 of 1
DATED : March 21, 2000
INVENTOR(S) : Glass, et al.

It is certified that error appears in the above-identified patent and that said Letters Patent is hereby corrected as shown below:

Column 5, claim 6,
Line 1, change the word "copier" to -- method --

Column 6, claim 12,
Line 1, chagne the word "copier" to -- apparatus --

Column 6, claim 14,
Line 2, change the words "indicating means comprises" to -- instructions comprise --

Signed and Sealed this

Thirtieth Day of October, 2001

Attest:

NICHOLAS P. GODICI
*Acting Director of the United States Patent and Trademark Office*

*Attesting Officer*